United States Patent [19]

Granfors et al.

[11] Patent Number: 5,452,338
[45] Date of Patent: Sep. 19, 1995

[54] METHOD AND SYSTEM FOR REAL TIME OFFSET CORRECTION IN A LARGE AREA SOLID STATE X-RAY DETECTOR

[75] Inventors: Paul R. Granfors; Jean-Claude Morvan, both of Milwaukee; Michael A. Juhl, Merton, all of Wis.

[73] Assignee: General Electric Company, Milwaukee, Wis.

[21] Appl. No.: 271,608

[22] Filed: Jul. 7, 1994

[51] Int. Cl.6 .............................................. H05G 1/64
[52] U.S. Cl. .............................. 378/98.11; 378/98.12; 378/207
[58] Field of Search ............... 378/207, 98, 98.2, 98.3, 378/98.8, 98.11, 98.12

[56] References Cited

U.S. PATENT DOCUMENTS 5,038,369  8/1991  Nishiki .............................. 378/98.12
5,296,937  3/1994  Nakatani et al. .................. 378/98.12

*Primary Examiner*—David P. Porta
*Assistant Examiner*—Don Wong
*Attorney, Agent, or Firm*—B. Joan Haushalter; John H. Pilarski

[57] ABSTRACT

Offset signals are removed from an incoming x-ray image produced by a large area solid state x-ray detector. A sequence of incoming dark images from the detector, when the detector is not exposed to x-rays, is recursively filtered to generate a low-noise, continuously-updated offset image. This low-noise continuously-updated offset image is stored in an offset image memory. The image in memory is subtracted from the incoming x-ray image to create a corrected image when the detector is exposed to x-rays.

9 Claims, 2 Drawing Sheets

METHOD AND SYSTEM FOR REAL TIME OFFSET CORRECTION IN A LARGE AREA SOLID STATE X-RAY DETECTOR

TECHNICAL FILED

The present invention relates to x-ray detectors and, more particularly, to offset correction in large area solid state x-ray detectors.

BACKGROUND ART

Large area solid state x-ray detectors are currently being developed in the x-ray art. Such a detector typically comprises a scintillating layer in contact with an array of photodiodes, each with an associated FET switch. The photodiodes are initially charged by connecting them to a known stable voltage through the switches. Subsequently, the photodiodes are isolated by turning the FETs off. Upon exposure to x-rays, the scintillator produces light which discharges each photodiode in proportion to the x-ray exposure at the position of the diode. The diodes are then recharged by again connecting them to the known stable voltage. The charge used to restore the diode to its initial voltage is measured by a sensing circuit, and the value is digitized and stored.

In addition to an x-ray induced signal, the signal of each pixel includes an offset which is independent of x-ray exposure. This offset has several sources including leakage current in the photodiodes and charge retention in the FET switches. At low signal levels, such as found in fluoroscopic imaging, the magnitude of the offset can be larger than the x-ray signal. Furthermore, the offset is not uniform, but varies from pixel to pixel in such a manner that it interferes with the visualization of information in the x-ray image. This pixel-dependent offset must be subtracted from the x-ray exposed image to produce a corrected image before viewing.

One means of isolating the offset from the x-ray induced signal is to acquire an image when the detector is not exposed to x-rays, i.e., a dark image, with the same timing used for acquisition of the x-ray image, in order for the signals in the dark image to match the offset signals in the x-ray image. Because there is noise associated with the offset signals, a single dark image subtracted from an x-ray image would introduce additional noise into the corrected image. To reduce the amount of this noise, several dark images could be averaged together to obtain a low-noise offset image. However, the offset signals may drift with time, temperature, and other external factors. Therefore, the offset image must be updated periodically.

It would be desirable then to have a means for periodically updating the offset image.

SUMMARY OF THE INVENTION

The present invention is a method and system for continuously updating the offset image to provide a low-noise offset image which, when subtracted from the x-ray image, correctly removes the current offset signals and contributes a negligible amount of noise to the corrected image. In the normal operation of the detector, it is advantageous to continually read the detector even when x-ray imaging is not being performed. This process, called scrubbing, keeps the detector photodiodes charged despite photodiode leakage and maintains a consistent starting condition for x-ray imaging. Although the signals obtained during scrubbing would normally be ignored, in the present invention these signals are utilized to obtain a continuously-updated, low-noise estimate of the offset.

In accordance with one aspect of the present invention, offset signals are removed from an incoming x-ray image produced by a large area solid state x-ray detector. A sequence of incoming dark images from the detector, when the detector is not exposed to x-rays, is recursively filtered to generate a low-noise, continuously-updated offset image. This low-noise continuously-updated offset image is stored in an offset image memory. The image in memory is subtracted from the incoming x-ray image to create a corrected image when the detector is exposed to x-rays.

Accordingly, it is an object of the present invention to provide a means for periodically updating the offset image. Other objects and advantages of the invention will be apparent from the following description, the accompanying drawings and the appended claims.

DETAILED DESCRIPTION OF THE PREFERRED EMBODIMENTS

An offset can be isolated from the x-ray induced signal by acquiring an image when the detector is not exposed to x-rays, i.e., a dark image, with the same timing used for acquisition of the x-ray image, in order for the signals in the dark image to match the offset signals in the x-ray image. Because there is noise associated with the offset signals, a single dark image subtracted from an x-ray image would introduce additional noise into the corrected image. To reduce the amount of this noise, several dark images could be averaged together to obtain a low-noise offset image. However, the offset signals may drift with time, temperature, and other external factors. Therefore, the offset image must be updated periodically, in accordance with the present invention.

The present invention relates to achieving offset correction for large area solid state x-ray detectors. An offset image memory is continuously updated to provide a low-noise offset image which, when subtracted from an x-ray image, correctly removes the current offset signals and contributes a negligible amount of noise to a corrected image.

Figure 1:
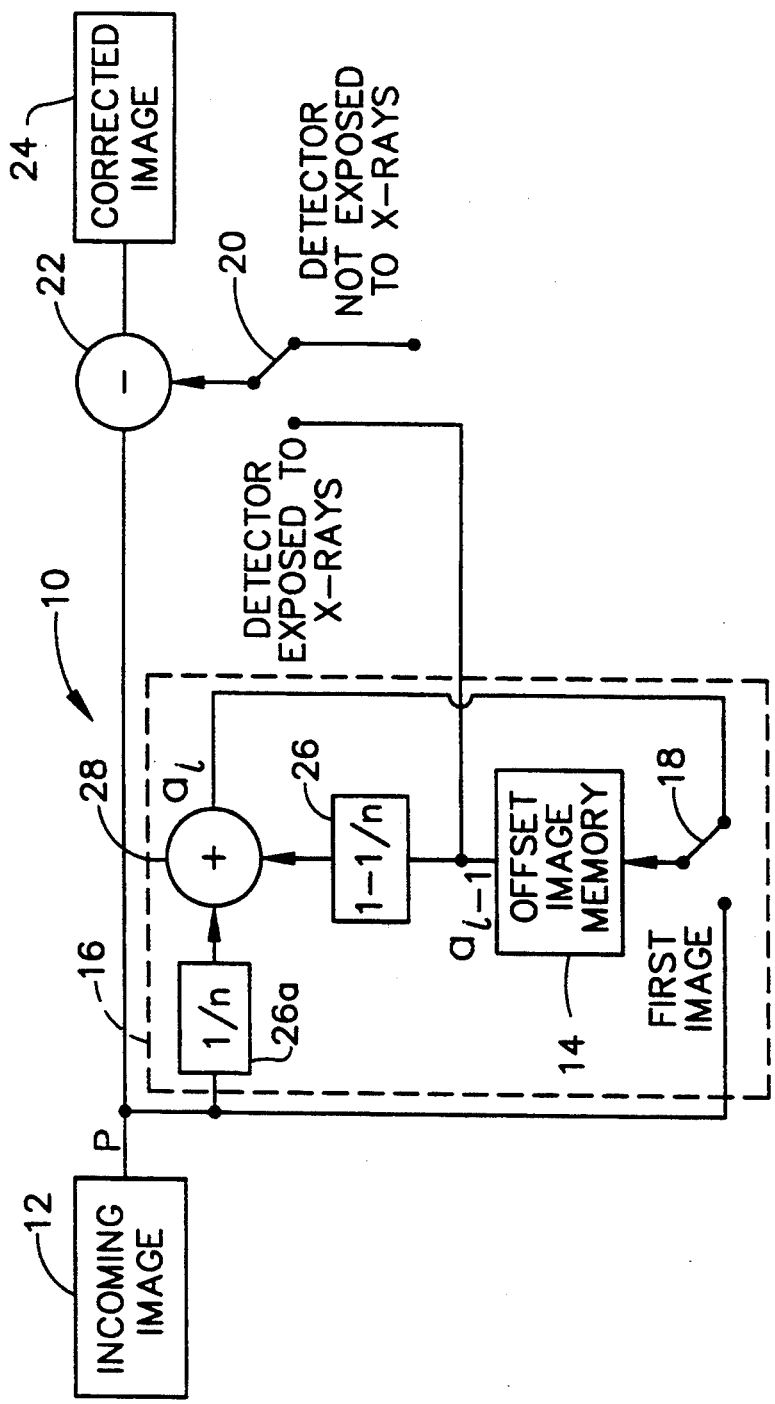
FIG. 1 is a block diagram of an implementation of the offset correction scheme of the present invention, showing how a low-noise offset image is created and how it is used to correct an incoming x-ray image.

Referring now to the drawings, FIG. 1 illustrates a block diagram of one implementation of an offset correction system 10 of the present invention. A detector (not shown) produces incoming images 12 at some rate. For example, a typical rate is thirty images per second. These images are produced either with the detector exposed to x-rays or with the detector not exposed to x-rays.

If the detector is not exposed to x-rays, the incoming image is combined with the contents of a stored offset image memory 14 and that memory is updated. This process produces a low-noise, continuously updated offset image in the image memory 14. If the detector is exposed to x-rays, the offset image stored in memory 14 is subtracted from the incoming image 12 to produce a corrected image with offset signals removed.

Continuing with FIG. 1, if the detector is not exposed to x-rays, a switch 20 is placed in a position indicating "detector not exposed to x-rays". In this configuration incoming images, which are dark images, are used to update a low-noise offset image contained in offset image memory 14. At startup and at other times as necessary, a switch 18 is put in a "first image" position, and the incoming dark image replaces the contents of the offset image memory 14. After this image is stored, switch 18 is switched back to its original position, as illustrated in FIG. 1. Subsequently, additional dark images are acquired. As each image is acquired, it is combined with the contents of the offset image memory 14 using a recursive filter 16. The action of this filter can be described by Equation 1 below:

$$a_i = (1 - 1/n)(a_{i-1}) + (1/n)(p) \tag{1}$$

In Equation 1, p represents an incoming pixel value; $a_{i-1}$ is the present pixel value in the offset image memory; and $a_i$ is the output of the filter. It should be understood that the filter acts on each pixel of the incoming image 12, combining it with the corresponding pixel of the image in the offset memory 14. The output of the filter, $a_i$ for each pixel position, constitutes a new, reduced-noise offset image. This image is used to overwrite the previous contents, $a_{i-1}$, of the offset image memory 14.

The recursive filter 16 acts as a temporal filter on the sequence of incoming images 12, to produce a low noise offset image in the offset image memory 14. The value of n controls the amount of noise reduction and the speed of updating the offset image memory. Smaller values of n will produce faster updating but less noise smoothing, whereas larger values of n will produce slower updating and more smoothing. The recursive filter 16 reduces noise by the same amount as would an average of 2n-1 images, and the filter 16 responds to changes with a time constant of about n -½ iterations. For example, if n is chosen to be sixteen, and the rate of incoming images from the detector is 30 Hz, the recursive filter 16 will provide noise smoothing equivalent to an averaging of thirty-one images and the time constant for response to changes will be approximately 0.52 seconds.

When the detector is exposed to x-rays, the switch 20 is placed in a position indicating "detector exposed to x-rays". With switch 20 in this position, the updating action of the recursive filter 16 is halted. Instead, the low-noise offset image stored in the offset image memory 14 is subtracted from the incoming image 12, which is an incoming x-ray image, using the subtractor 22. The result of this subtraction is to remove the offset signals from the x-ray image and produce a corrected image 24.

The recursive filter 16 can achieve the noise reduction and automatic update by any suitable means. In a preferred embodiment, the recursive filter 16 comprises multipliers 26a and 26b and adder 28. The multiplier 26a multiplies the pixel values in the incoming image p by a multiplier of 1/n. The multiplier 26b multiplies the pixel values stored in the offset image memory 14 by a multiplier of (1-1/n). The results of both multipliers 26a and 26b are input to the adder 28 to generate an output image with pixel values $a_i$, which is stored in the offset image memory 14.

Figure 2:
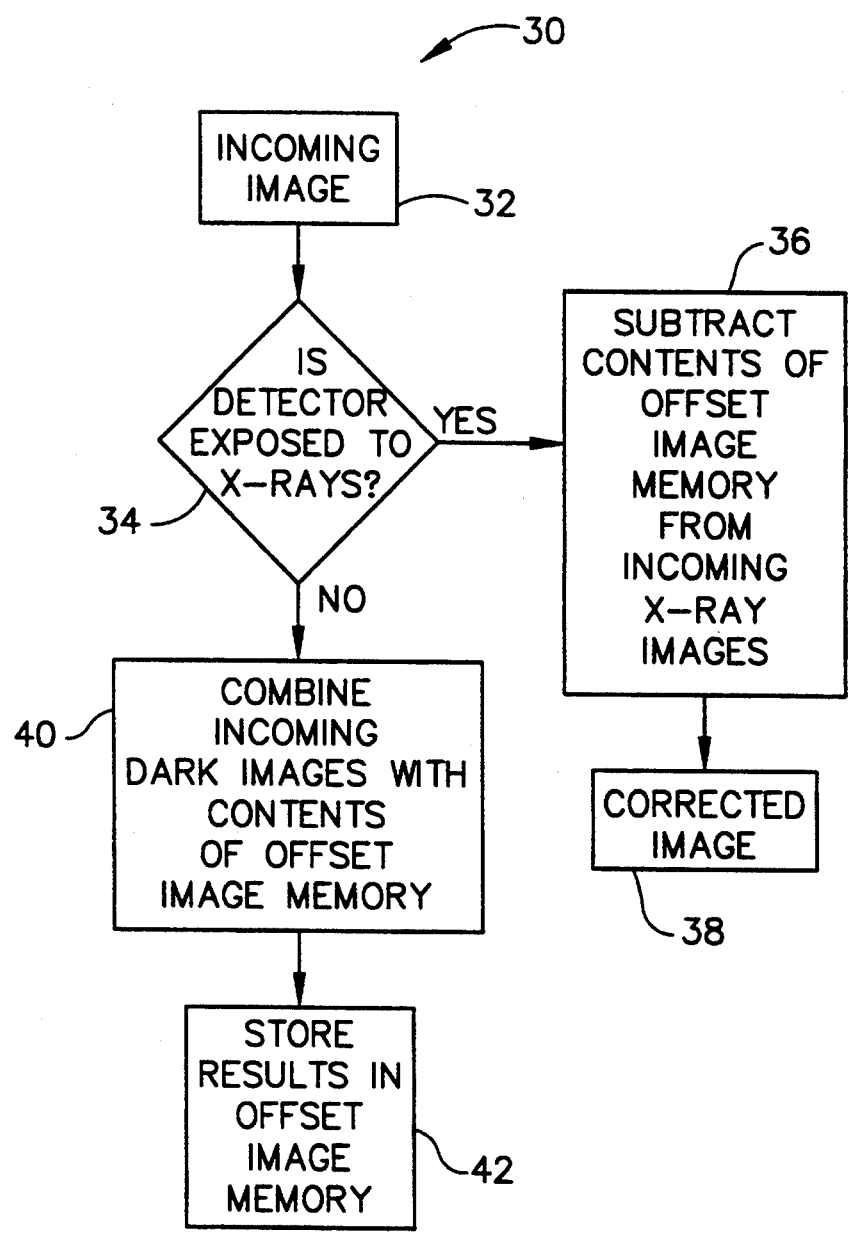
FIG. 2 is a flow chart illustrating the steps employed to correct an x-ray image by implementing the offset correction scheme of FIG. 1.

Referring now to FIG. 2 and continuing with FIG. 1, there is illustrated a flow chart 30 of the steps employed to correct an incoming x-ray image by implementing the offset correction scheme of FIG. 1. In the flow chart 30, incoming images are produced by a detector, as indicated by block 32. At decision block 34 it is determined if the detector is exposed to x-rays. If the detector is exposed to x-rays, the program proceeds to step 36 where the contents of offset image memory 14 are subtracted from the incoming image 12 in subtractor 22. The result is the corrected image, as indicated by block 38. If it is determined at decision block 34 that the detector is not exposed to x-rays, the program proceeds to step 40 where the incoming image is combined with the image stored in the offset image memory 14. The result of this combination is a new offset image. The updated offset image is then stored in offset image memory 14, as indicated in block 42.

It will be obvious to those skilled in the art that various modifications and variations of the present invention are possible without departing from the scope of the invention, which provides a method and system for removing offset signals from an incoming x-ray image produced by a large area solid state x-ray detector. According to the present invention, a low-noise, continuously-updated offset image is created by recursively filtering incoming images from the detector when the detector is not exposed to x-rays. This low-noise offset image is stored in an offset image memory. When the detector is exposed to x-rays, the image in memory is subtracted from the incoming x-ray image to create a corrected image.

The invention has been described in detail with particular reference to certain preferred embodiments thereof, but it will be understood that modifications and variations can be effected within the spirit and scope of the invention.

We claim:

1. A method for removing offset signals from an incoming x-ray image produced by a large area solid state x-ray detector, comprising the steps of:
    recursively filtering a sequence of incoming dark images from the detector, when the detector is not exposed to x-rays, to generate a low-noise, continuously-updated offset image;
    storing the low-noise continuously-updated offset image in an offset image memory;
    subtracting the image in memory from the incoming x-ray image to create a corrected image with the offset signals removed, when the detector is exposed to x-rays.

2. A method for continuously updating an offset image as claimed in claim 1 further comprising the step of combining subsequent incoming dark images with the low-noise continuously-updated offset image in the offset image memory, when the detector is not exposed to x-rays.

3. A method for continuously updating an offset image as claimed in claim 1 wherein the step of recursively filtering a sequence of incoming dark images comprises the steps of:
    multiplying pixel values in an image from the sequence of incoming dark images by a multiplier of 1/n to generate first multiplied values;
    multiplying pixel values stored in the offset image memory by a multiplier of (1-1/n) to generate second multiplied values;
    adding the first and second multiplied values and generating output pixel values for storage in the offset image memory.

4. A method for continuously updating an offset image as claimed in claim 3 wherein the value of n controls amount of noise reduction and speed of updating of the offset image memory.

5. A system for removing offset signals from an incoming x-ray image produced by a large area solid state x-ray detector, comprising:

a recursive filter for filtering a sequence of incoming dark images from the detector, when the detector is not exposed to x-rays, to generate a low-noise, continuously-updated offset image;

an offset image memory for storing the low-noise continuously-updated offset image;

means for subtracting the image in memory from the incoming x-ray image to create a corrected image with the offset signals removed, when the detector is exposed to x-rays.

6. A system for continuously updating an offset image as claimed in claim 5 further comprising means for combining subsequent incoming dark images with the low-noise continuously-updated offset image in the offset image memory, when the detector is not exposed to x-rays.

7. A system for continuously updating an offset image as claimed in claim 6 wherein the means for combining subsequent incoming dark images with the low-noise continuously-updated offset image in the offset image memory, when the detector is not exposed to x-rays, comprises the recursive filter.

8. A system for continuously updating an offset image as claimed in claim 7 wherein the recursive filter comprises:

a first multiplier for multiplying pixel values in an image from the sequence of incoming dark images by a multiplier of $1/n$ to generate first multiplied values;

a second multiplier for multiplying pixel values stored in the offset image memory by a multiplier of $(1-1/n)$ to generate second multiplied values;

an adder for adding the first and second multiplied values and generating output pixel values for storage in the offset image memory.

9. A system for continuously updating an offset image as claimed in claim 8 wherein the value n controls amount of noise reduction and speed of updating of the offset image memory.

* * * * *